United States Patent [19]

Shore

[11] Patent Number: 5,604,007
[45] Date of Patent: Feb. 18, 1997

[54] METHOD FOR PRODUCING POLYAMIDE CARPET FIBERS WITH IMPROVED FLAME RETARDANCY

[75] Inventor: Gary W. Shore, Asheville, N.C.

[73] Assignee: BASF Corporation, Mt. Olive, N.J.

[21] Appl. No.: 109,413

[22] Filed: Aug. 19, 1993

Related U.S. Application Data

[63] Continuation of Ser. No. 846,510, Mar. 6, 1992, abandoned.

[51] Int. Cl.$^6$ .............................. B32B 3/02; C08C 83/05
[52] U.S. Cl. .............................. 428/92; 428/95; 428/96; 525/101; 525/104; 525/431; 524/405
[58] Field of Search .............................. 428/92, 95, 96; 525/101, 104, 431; 524/405

[56] References Cited

U.S. PATENT DOCUMENTS

| | | | |
|---|---|---|---|
| 3,731,352 | 5/1973 | Okamoto et al. | 28/112 |
| 3,829,400 | 8/1974 | Kato et al. | 260/37 N |
| 4,012,546 | 3/1977 | Schwartz et al. | 428/97 |
| 4,061,810 | 12/1977 | Minhas et al. | 428/97 |
| 4,064,298 | 12/1977 | Schwartz et al. | 428/95 |
| 4,097,630 | 6/1978 | Schwartz et al. | 428/97 |
| 4,116,931 | 9/1978 | Minhas et al. | 260/45.75 B |
| 4,141,880 | 2/1979 | Nametz et al. | 260/37 N |
| 4,173,671 | 11/1979 | Minhas et al. | 428/85 |
| 4,500,688 | 2/1985 | Arkles | 525/431 |
| 4,689,256 | 8/1987 | Slosberg et al. | 428/97 |
| 4,714,739 | 12/1987 | Arkles | 525/101 |
| 4,778,704 | 10/1988 | Wells et al. | 428/97 |
| 4,831,071 | 5/1989 | Ward et al. | 524/401 |
| 4,874,660 | 10/1989 | Davis et al. | 428/280 |
| 4,891,407 | 1/1990 | Mitchell | 525/104 |
| 4,970,263 | 11/1990 | Arkles et al. | 525/431 |
| 5,135,960 | 8/1992 | Higuchi et al. | 521/76 |

FOREIGN PATENT DOCUMENTS

| | | |
|---|---|---|
| 0046954 | 3/1982 | European Pat. Off. . |
| 01168919 | 7/1989 | Japan . |
| 04272216 | 9/1992 | Japan . |

OTHER PUBLICATIONS

Encyclopedia of Textiles, Fibers, and Nonwoven Fabrics Ed. Martin Grayson, Niley and Son 1980.

*Primary Examiner*—Helen Lee
*Attorney, Agent, or Firm*—Nixon & Vanderhye P.C.

[57] ABSTRACT

A method for producing halogen-free, antimony-free and phosphorous-free polyamide fibers is described by incorporating an additive into the polyamide which comprises a vulcanizable mixture of silicones and a catalyst in a thermoplastic matrix. The fibers have improved flame retardancy and are used for the manufacture of carpets.

14 Claims, No Drawings

METHOD FOR PRODUCING POLYAMIDE CARPET FIBERS WITH IMPROVED FLAME RETARDANCY

This is a continuation of application Ser. No. 07/846,510 filed on Mar. 6, 1992, now abandoned.

FIELD OF THE INVENTION

The present invention is directed to a method for producing polyamide fibers with improved flame retardancy for the manufacture of fibers for carpets, more specifically it is directed to the production of halogen-free, antimony-free and phosphorous-free polyamide fibers with improved flame retardancy by incorporating in the polyamide melt a vulcanizable mixture of silicones in a thermoplastic polymer matrix.

BACKGROUND OF THE INVENTION

The main approaches to flame retarding polyamides are melt additives, topical finish treatments, and copolymerization with flame resistant monomers. Melt additives generally include halogenated organic compounds with high levels of bromine or chlorine. A second component when halogenated compounds are employed is antimony trioxide ($Sb_2O_3$). Other popular elements found in melt additives are phosphorus and molybdenum. The melt additive approach has found limited utility in polyamide fibers due to the necessary high loadings, discoloration of polymer with some phosphorus and molybdenum compounds, and high smoke generation due to brominated compounds. Finish treatments generally require high add-on levels, and many of these lack the durability to cleaning procedures required for polyamide fabrics such as carpeting. Copolymerization is an effective way to produce flame retardant polymers; however, many of these are not considered fiber spinning grade.

U.S. Pat. No. 3,829,400 discloses a flame retardant polyamide fiber composition using an oxy-tin compound and a halogen as flame retardant agents.

U.S. Pat. No. 4,141,880 discloses a flame retardant nylon composition which contains a condensation product derived from brominated phenol.

U.S. Pat. No. 4,064,298 discloses a flame retardant polyamide fiber containing zinc brats and an organic halide.

U.S. Pat. Nos. 4,116,931 and 4,173,671 disclose flame retardant fibers and carpets which contain complex salts such as metal borocitrates or borotartrates.

An object of the present invention was to provide a polyamide fiber with improved flame retardancy which is halogen-free, antimony-free and phosphorous-free.

Another object was a method of producing such polyamide fibers. Still another object was a carpet with improved flame retardancy.

SUMMARY OF THE INVENTION

The objects of the present invention could be achieved by incorporating from about 0.05% to 50% by weight, based on the weight of the total fiber composition, an additive comprising a vulcanizable mixture of silicones and a platinum complex catalyst in a thermoplastic polymer matrix. Upon melt spinning, the silicones react to form a pseudointerpenetrating polymer network of silicones while leaving the thermoplastic polyamide matrix essentially unaffected, and thus the fiber maintains its thermoplastic character. This network structure within the polyamide matrix is thought to give the fiber improved flame retardancy.

A further improvement in flame retardancy of the polyamide fibers could be achieved by incorporating together with the silicone additive from about 0.1% to 5% by weight, based on the total weight of the fiber composition, of a zinc salt as a second additive component.

DETAILED DESCRIPTION OF THE INVENTION

Polyamides are well known by the generic term "nylon" and are long chain synthetic polymers containing amide (—CO—NH—) linkages along the main polymer chain. Suitable fiber-forming or melt spinnable polyamides of interest for this invention include those which are obtained by the polymerization of a lactam or an amino acid, or those polymers formed by the condensation of a diamine and a dicarboxylic acid. Typical polyamides include nylon 6, nylon 6/6, nylon 6/9, nylon 6/10, nylon 6/12, nylon 11, nylon 12 and copolymers thereof or mixtures thereof. Polyamides can also be copolymers of nylon 6 or nylon 6/6 and a nylon salt obtained by reacting a dicarboxylic acid component such as terephthalic acid, isophthalic acid, adipic acid or sebacic acid with a diamine such as hexamethylene diamine, methaxylene diamine, or 1,4-bisaminomethylcyclohexane. Preferred are poly-ε-caprolactam (nylon 6) and polyhexamethylene adipamide (nylon 6/6). Most preferred is nylon 6.

The primary additive comprises a vulcanizable or curable mixture of silicones and a platinum complex catalyst in a thermoplastic polymer matrix. Such compositions are disclosed in U.S. Pat. Nos. 4,500,688 and 4,714,739 the contents of which are herewith incorporated rated by reference. The mixture of silicones generally will comprise a polymeric silicone hydride and a polymeric silicone containing at least one unsaturated group, preferably a vinyl group. The catalyst is a platinum complex preferably derived from chloroplatinic acid and a vinyl siloxane. The vinyl siloxane forms an active complex with the platinum, and the resulting complex is soluble in the silicones to be vulcanized. A thermoplastic polymer serves as the matrix, with suitable polymers being, for example, nylon 6, nylon 6/6, nylon 6/9, nylon 6/10, nylon 6/12, nylon 11, nylon 12 and copolymers and mixtures thereof. The preferred matrix nylons are nylon 6 and nylon 6/6, with the most preferred being nylon 6.

The mixture comprising a suitable thermoplastic polymer and a vulcanizable silicone is melt mixed for example in an extruder and then pelletized. To the pellets is added the platinum complex in an amount to give about 1 to 15 ppm platinum by weight of pellets. The pellets with the added platinum complex are herein referred to as the primary additive. Since the primary additive is intended for fiber melt spinning, all ingredients used in the composition must be extrusion grade. Weight percent of silicones in the primary additive, based on the total weight of the primary additive, is in the range of about 5% to 20%. A more preferred range is about 10% to 15% based on the weight of the primary additive.

The primary additive is then combined with a fiber melt spinning grade thermoplastic polyamide. Fiber melt spinning quality polyamides are generally supplied as pellets, thus facilitating easy mixing with the primary additive pellets. A master blend of the pellets can be made off-line and subsequently fed to an extruder, or an in-line dry material feeder/blender can be used to dose and blend the pellets, provided the feeder has good dosing accuracy. The dosing can be done volumetrically or gravimetrically. Other methods of getting an intimate blend of the primary additive pellets and the fiber spinning pellets will be obvious to those skilled in the art. The primary additive pellets are incorporated in amounts from about 0.05% to 50% by weight based on the total composition weight. A more preferred range is 0.25 to 30 weight percent of primary additive, and the most preferred range is 1.25 to 20 weight percent. The pellet mixture is melt mixed and homogenized for example in an extruder at temperatures in the range of about 250° C. to about 300° C., preferably of about 255° C. to about 285° C. At these elevated temperatures, a reaction is initiated whereby the silicones combine in situ to form a pseudointerpenetrating polymer network.

A thoroughly homogenized melt stream emerges from the extruder. From this point, the technique of fiber melt spinning is well known in the art. A preferred method is to direct the melt via Dowtherm heated polymer distribution lines to the spinning head of the spin beam. The polymer melt stream is then metered by a close tolerance gear pump to a spin pack assembly containing a spinnerette plate with several capillaries. Polymer melt is extruded or pushed through the capillaries under pressure to form a multitude of individual filaments.

In a preferred embodiment of this invention, the extruded filaments (or fibers) are quenched with a cross flow of chilled air in order to solidify the filaments. The filaments are then treated with a finish comprising a lubricating oil or mixture of oils and antistatic agents. Filaments are then combined to form a yarn bundle which is then wound-up on a suitable package. In a subsequent step, the yarn is drawn and texturized to form a bulked continuous filament (BCF) yarn suitable for tufting into carpets. A more preferred technique involves combining the extruded or as-spun filaments into a yarn, then drawing, texturizing and winding a package, all in a single step. This one-step method of making BCF is referred to in the trade as spin-draw-texturing.

The reaction which is initiated in the melt state, whereby the vulcanizable silicones start to form a pseudointerpenetrating polymer network, continues after the fibers are solidified and is essentially complete a few hours after fiber spinning.

Further improvements in the flame retardancy of the polyamide fibers can be achieved by incorporating effective amounts of a secondary additive in the spinning compositions. The secondary additive is a zinc compound selected from the group comprising hydrated zinc borate, zinc oxide and zinc hydroxide. A hydrated zinc borate which can retain its water of hydration up to 290° C. is the preferred compound. Secondary additive levels are in the range from about 0.1% to 5.0% by weight based on the total spinning composition weight. A more preferred range is from about 0.25 to 3.0 weight percent. The zinc borate should be in a finely divided particle size so as not to disrupt fiber spinning processes and so physical properties of the finished fibers are retained. The zinc borate would normally be supplied as a concentrate pellet containing from about 15 to 30 weight percent of hydrated zinc borate and 70 to 85 weight percent of carrier. The carrier comprises a substantial amount of a polyamide, e.g. nylon 6, and minor amounts of ingredients such as dispersing agents and flow modifiers. The carrier must be compatible with the fiber spinning grade polyamide. The zinc borate secondary additive concentrate can be incorporated into the spinning composition using similar methods as described above for the primary additive.

In addition to the primary additive and zinc borate secondary additive concentrate, other various additives can be included in the spinning composition. These include, but are not limited to, lubricants, nucleating agents, antioxidants, ultraviolet light stabilizers, pigments, dyes, antistatic agents, soil resists, stain resists, antimicrobial agents, and other conventional flame retardants.

Nylon filaments for the purpose of carpet manufacturing have deniers (denier=weight in grams of a single filament with a length of 9000 meters) in the range of about 6 to 35 denier/filament (dpf). This translates to filament diameters in the range from about 25 to 75 micrometers. A mere preferred range for carpet fibers is from about 15 to 25 dpf.

From here, the BCF yarns can go through various processing steps well known to those skilled in the art. The fibers of this invention are particularly useful in the manufacture of carpets for floor covering applications.

To produce carpets for floor covering applications, the BCF yarns are generally tufted into a pliable primary backing. Primary backing materials are generally selected from the group comprising conventional woven jute, woven polypropylene, cellulosic nonwovens, and nonwovens of nylon, polyester, and polypropylene. The primary backing is then coated with a suitable latex material such as a conventional styrene-butadiene latex, vinylidene chloride polymer, or vinyl chloride-vinylidene chloride copolymers. It is common practice to use fillers such as calcium carbonate to reduce latex costs. In order to further reduce carpet flammability, it is also common to include hydrate materials in the latex formulation selected from the group comprising aluminum hydroxide, hydrated aluminum oxide, and hydrated aluminum silicates. The final step is to apply a secondary backing, generally a woven jute or woven synthetic such as polypropylene.

It is preferred for our invention to use a woven polypropylene primary backing, a conventional styrene-butadiene (SB) latex formulation, and either a woven jute or woven polypropylene secondary carpet backing. The SB latex can include calcium carbonate filler and/or one or more of the hydrate materials listed above.

Two test methods have been used to demonstrate the efficacy of this invention. The first method is a modification of the well known Methenamine Pill Test (Department of Commerce Standard DOC FF 1-70). Since results from the standard Pill Test can vary widely, a more statistically significant method has been developed based on DOC FF 1-70. The modified test involves measuring polymer burn time (PBT) of a carpet sample. Since the PBT's do not follow a normal statistical distribution, a conventional t-test or analysis of variance cannot be used to examine the significance of differences between sample averages. A Kruskal-Wallis test has been chosen for this purpose for simplicity.

For the modified pill test, dry carpet samples are prepared according to standard procedures outlined in DOC FF 1-70. Forty measurements of PBT are conducted on two, 9"×9" carpet squares for each sample to be tested, usually a control and an experimental carpet. PBT's for the control and experimental carpets are assorted in an ascending mode and ranked from 1 (shortest PBT) to 80 (longest PBT). The Kruskal-Wallis test evaluates ranks and not the actual experimental results. A parameter H is then computed and compared with CHISQ. If H is greater than CHISQ at a chosen significance level (e.g., 0.05 in our tests), it can be concluded that the average PBT's between control and experimental carpets are significantly different.

A rigorous treatment of the Kruskal-Wallis statistics can be found in the National Bureau of Standards Handbook 91.

The second test method is the "Critical Radiant Flux of Floor-Covering Systems Using A Radiant Heat Energy Source"(ASTM Method E-648), which will be referred to herein as simply Radiant Panel Test Method. The test apparatus comprises a gas-fired refractory radiant panel inclined at a 30 degree angle to a horizontally mounted test specimen. The panel temperature is maintained at about 525° C. For our purposes, carpets are burned in a glue down mode. This mode has yielded more reproducible results than when carpets are burned over a hair felt pad. Distance burned (in centimeters) is recorded and critical radiant energy is determined in terms of flux (watts/cm$^2$) read from a standard curve. A higher flux number indicates a less flammable carpet. At least three specimens/carpet sample are burned and the results averaged.

The invention is further illustrated by the examples that follow which are presented to show specific embodiments of the invention, but these examples should not be construed as limiting the spirit or the scope of the invention. All parts and percentages are by weight (based on the total weight of the fiber composition) unless otherwise stipulated.

EXAMPLE 1

Semi-dull BCF nylon 6 carpet yarns were prepared in the following manner. A physical blend of the following pelletized components was prepared: 1) 97.33% of nylon 6 polymer (BASF's Ultramid® BS-700) with a relative viscosity (RV) of 2.7 (measured by comparing, in an Ubbelohde viscometer at 25° C., flow time of a polymer solution containing one gram of nylon polymer in 100 milliliters of 96% sulfuric acid to flow time of the pure 96% sulfuric acid); 2) 1.0% of a concentrate comprising 30% of a manganese passivated anatase TiO$_2$ and 70% of a nylon 6 polymer with about a 1.9 RV; and 3) 1.67% of a mixture comprising 15% of vulcanizable silicones, a platinum complex catalyst, and nylon 6 polymer with a 2.7RV.

The above blend was fed to an extruder where it was thoroughly melted and mixed prior to filament extrusion. The homogenized melt stream was extruded at a melt temperature of about 270° C. through a spinnerette containing 68 capillaries at a rate of about 156 grams/minute. Filaments were produced to have trilobal shaped cross sections. Filaments were then combined into a single yarn and wound-up on a package at about 500 meters/minute. In a subsequent step, the undrawn or as-spun yarns were then drawn at about 3.1 times their original length, texturized in a steam medium, and wound-up on a suitable package. The final bulked continuous filament yarn has 68 filaments in the cross section and a total denier of about 1000 (i.e., 15 dpf). Two of these 1000 denier yarns were then twisted together with 3.5 turns/inch (tpi) to produce a 2-ply yarn.

Two-ply (1000/2/68) yarns were autoclave heat set at 132° C. Cut pile carpets were then made by tufting heat set yarns into a polypropylene primary backing on a ⅛ gauge cut pile tufting machine at a stitch rate of 7 stitches/inch and a ½" pile height to give 20 ounces/yard$^2$ fiber weight. Tufted carpets were dyed a disperse beige color. Dyed carpets were then divided into two sets. One set was coated with a conventional SB latex containing calcium carbonate filler and then secondary backed with a woven jute material. The other set was coated with a similar latex; however, this set was given a woven polypropylene secondary backing. A final step was a light tip shearing to remove fuzz. Results of flammability tests can be found in Tables I & II.

EXAMPLE 2

A physical blend of the following pelletized components was prepared: 1) 95.67% of Ultramid® BS-700 nylon 6; 2) 1.0% of TiO$_2$ concentrate (same material as in Example 1); and 3) 3.33% of silicone-Pt complex-nylon 6 mixture used in Example 1. This blend was processed into carpets in a manner consistent with Example 1. Carpet flammability results can be found in Tables I & II.

EXAMPLE 3

A physical blend of the following pelletized components was prepared:1) 92.33% of Ultramid® BS-700 nylon 6; 2) 1.0% TiO$_2$ concentrate (same material as in Example 1); and 3) 6.67% of silicone-Pt complex-nylon 6 mixture used in Example 1. This blend was processed into carpets in a manner consistent with Example 1. Carpet flammability results are found in Tables I & II.

EXAMPLE 4

A physical blend of the following pelletized components was prepared and processed into carpets in a manner consistent with Example 1: 1) 85.67% of Ultramid® BS-700 nylon 6; 2) 1.0% TiO$_2$ concentrate (same material as in Example 1); and 3) 13.33% of silicone-Pt complex-nylon 6 mixture used in Example 1. Carpet flammability results are found in Tables I & II.

EXAMPLE 5

A physical blend of the following pelletized components was prepared and processed into carpets in a manner consistent with Example 1, except that the blend was extruded at a melt temperature of 285° C.: 1) 94.0% of Ultramid® BS-700 nylon 6; 2) 1.0% TiO$_2$ concentrate (same material as in Example 1); and 3) 5.0% of a mixture comprising 10% of vulcanizable silicones, a platinum complex catalyst, and a nylon 6/6 extrusion grade polymer. Carpet flammability results can be found in Tables I & II.

EXAMPLE 6

A physical blend of the following pelletized components was prepared and processed into carpets in a manner consistent with Example 5: 1) 89.0% of Ultramid® BS-700 nylon 6; 2) 1.0% TiO$_2$ concentrate (same material as in Example 1); and 3) 10.0% of the silicone-Pt complex-nylon 6/6 mixture used in Example 5. Carpet flammability results can be found in Tables I & II.

EXAMPLE 7 (Comparative)

A physical blend of the following pelletized components was prepared as a control, i.e., without any of the silicone-Pt complex-polyamide mixture: 1) 99.0% of Ultramid® BS-700 nylon 6 and 2) 1.0% TiO$_2$ concentrate (same material as used in Example 1). The blend was processed into carpets in a manner consistent with Example 1. Carpet flammability results are found in Tables I & II.

EXAMPLE 8

A physical blend of the following pelletized components was prepared:1) 92.0% of Ultramid® BS-700 nylon 6; 2) 1.0% TiO$_2$ concentrate (same material as in Example 1); 3) 5.0% of the silicone-Pt complex-nylon 6/6 mixture used in Example 5; and 4) 2.0% of a concentrate comprising 25% of a hydrated zinc berate (Firebrake® ZB manufactured by U.S. Borax) and 75% carrier which is substantially nylon 6.

The blend is processed into carpets in a manner similar to Example 1 with the following exceptions:1) extruded at a melt temperature of 285° C.; 2) extrusion rate of about 161 grams/minute; 3) 68 filaments with a total BCF yarn denier of 1050; 4) cut pile carpet tufted at 7.8 stitches/inch to give 25 oz/yd$^2$ fiber weight. Carpet flammability results can be found in Tables I & II.

EXAMPLE 9

A physical blend of the following pelletized components was prepared and processed into carpets in a manner consistent with Example 8: 1) 85.0% of Ultramid® BS-700 nylon 6; 2) 1.0% TiO$_2$ concentrate (same material as in Example 1); 3) 10.0% of the silicone-Pt complex-nylon 6/6 mixture used in Example 5; and 4) 4.0% hydrated zinc berate concentrate (same material as used in Example 8). Results of carpet flammability tests can be found in Tables I & II.

EXAMPLE 10 (Comparative)

This example was prepared in order to show the effects of adding hydrated zinc berate to the fibers, but without the addition of the silicone-Pt complex-nylon 6/6 mixture. A physical blend of the following pelletized components was prepared and processed into carpets in a manner consistent with Example 8, except the melt was extruded at a temperature of 270° C.: 1) 97.0% of Ultramid® BS-700 nylon 6; 2) 1.0% TiO$_2$ concentrate (same material as used in Example 1 ); and 3 ) 2.0% hydrated zinc berate concentrate (same material as used in Example 8). Results of carpet flammability tests can be found in Tables I & II.

EXAMPLE 11 (Comparative)

This was another example to show effects of adding hydrated zinc borate without the addition of any silicone-Pt complex-nylon 6/6 mixture. A physical blend of the following pelletized components was prepared and processed into carpets in a manner consistent with Example 10: 1) 95.0% of Ultramid® BS-700 nylon 6; 2) 1.0% TiO$_2$ concentrate (same material as used in Example 1); and 3) 4.0% hydrated zinc borate concentrate (same material as used in Example 8). Results of carpet flammability tests can be found in Tables I & II.

EXAMPLE 12 (Comparative)

A physical blend of the following pelletized components was prepared as a control, i.e., without any of the inventive additives: 1) 99.0% of Ultramid® BS-700 nylon 6 and 2) 1.0% TiO$_2$ concentrate (same material as used in Example 1). The blend was processed into carpets in a manner consistent with Example 10. Carpet flammability results can be found in Tables I & II.

These examples clearly illustrate the effectiveness of the primary additive (a vulcanizable mixture of silicones and a platinum complex catalyst in a thermoplastic polymer matrix such as polyamide) in improving the flame retardancy of nylon carpet fibers and yarns. Moreover, the PBT data demonstrate that a blend of the primary additive and a secondary additive such as hydrated zinc berate, has a synergistic effect in reducing nylon carpet flammability compared with the primary additive functioning alone.

Although certain preferred embodiments of the present invention have been disclosed herein for illustrative purposes, it will be understood that various modifications thereof can be undertaken without departure from the basic underlying principles. Aforementioned modifications are therefore deemed to lie within the spirit and scope of the invention.

TABLE I

CARPET FLAMMABILITY DATA FROM RADIANT PANEL TESTING (ASTM E-648)

| EXAMPLE NO. | FLAME RETARDANT ADDITIVES | SECONDARY BACKING | CARPET WEIGHT FACE FIBER (OZ/YD*2) | CRITICAL RADIANT FLUX (WATTS/CM*2) |
|---|---|---|---|---|
| 1 | 1.67% Silicone-Pt complex-nylon 6 mixture | Polypropylene | 20 | 1.20 |
| 2 | 3.33% Silicone-Pt complex-nylon 6 mixture | Polypropylene | 20 | 1.06 |
| 3 | 6.67% Silicone-Pt complex-nylon 6 mixture | Polypropylene | 20 | 1.20 |
| 4 | 13.33% Silicone-Pt complex-nylon 6 mixture | Polypropylene | 20 | 1.20 |
| 5 | 5.0% Silicone-Pt complex-nylon 6/6 mixture | Polypropylene | 20 | 1.20 |
| 6 | 10.0% Silicone-Pt complex-nylon 6/6 mixture | Polypropylene | 20 | 1.20 |
| 7 | Control, no additives | Polypropylene | 20 | 0.67 |
| 8 | 5.0% Silicone-Pt complex-nylon 6/6 mixture 2.0% Concentrate of zinc borate | Polypropylene | 25 | 0.98 |
| 9 | 10.0% Silicone-Pt complex-nylon 6/6 mixture 4.0% Concentrate of zinc borate | Polypropylene | 25 | 1.20 |
| 10 | 2.0% Concentrate of zinc borate | Polypropylene | 25 | 1.20 |
| 11 | 4.0% Concentrate of zinc borate | Polypropylene | 25 | 1.01 |
| 12 | Control, no additives | Polypropylene | 25 | 0.56 |

TABLE II

CARPET FLAMMABILITY DATA FROM MODIFIED METHENAMINE PILL TEST

| EXAMPLE NO. | FLAME RETARDANT ADDITIVES | SECONDARY BACKING | CARPET WEIGHT FACE FIBER (OZ/YD*2) | AVERAGE POLYMER BURN TIME (SECONDS) | CHISQ | PARAMETER H | SIGNIFICANTLY DIFFERENT FROM CONTROL AT 0.05 LEVEL |
|---|---|---|---|---|---|---|---|
| 1 | 1.67% Silicone-Pt complex-nylon 6 mixture | Jute | 20 | 3.62 | 3.84 | 31.80 | YES — CONTROL IS EXAMPLE NO. 7 |
| 2 | 3.33% Silicone-Pt complex-nylon 6 mixture | Jute | 20 | 1.86 | 3.84 | 43.83 | YES — CONTROL IS EXAMPLE NO. 7 |
| 3 | 6.67% Silicone-Pt complex-nylon 6 mixture | Jute | 20 | 4.55 | 3.84 | 24.56 | YES — CONTROL IS EXAMPLE NO. 7 |
| 4 | 13.33% Silicone-Pt complex-nylon 6 mixture | Jute | 20 | 4.70 | 3.84 | 25.23 | YES — CONTROL IS EXAMPLE NO. 7 |
| 5 | 5.0% Silicone-Pt complex-nylon 6/6 mixture | Jute | 20 | 3.18 | 3.84 | 35.13 | YES — CONTROL IS EXAMPLE NO. 7 |
| 6 | 10.0% Silicone-Pt complex-nylon 6/6 mixture | Jute | 20 | 3.27 | 3.84 | 33.22 | YES — CONTROL IS EXAMPLE NO. 7 |
| 7 | Control, no additives | Jute | 20 | 17.38 | — | — | CONTROL SAMPLE |
| 8 | 5.0% Silicone-Pt complex-nylon 6/6 mixture 2.0% Concentrate of zinc borate | Jute | 25 | 0.65 | 3.84 | 48.53 | YES — CONTROL IS EXAMPLE NO. 12 |
| 9 | 10.0% Silicone-Pt complex-nylon 6/6 mixture 4.0% Concentrate of zinc borate | Jute | 25 | 0.38 | 3.84 | 53.20 | YES — CONTROL IS EXAMPLE NO. 12 |
| 10 | 2.0% Concentrate of zinc borate | Jute | 25 | 7.14 | 3.84 | 6.31 | YES — CONTROL IS EXAMPLE NO. 12 |
| 11 | 4.0% Concentrate of zinc borate | Jute | 25 | 8.07 | 3.84 | 2.11 | NO — CONTROL IS EXAMPLE NO. 12 |
| 12 | Control, no additives | Jute | 25 | 11.08 | — | — | CONTROL SAMPLE |
| 1 | 1.67% Silicone-Pt complex-nylon 6 mixture | Polypropylene | 20 | 2.55 | 3.84 | 36.58 | YES — CONTROL IS EXAMPLE NO. 7 |
| 2 | 3.33% Silicone-Pt complex-nylon 6 mixture | Polypropylene | 20 | 1.06 | 3.84 | 50.23 | YES — CONTROL IS EXAMPLE NO. 7 |
| 3 | 6.67% Silicone-Pt complex-nylon 6 mixture | Polypropylene | 20 | 1.56 | 3.84 | 42.63 | YES — CONTROL IS EXAMPLE NO. 7 |
| 4 | 13.33% Silicone-Pt complex-nylon 6 mixture | Polypropylene | 20 | 1.53 | 3.84 | 41.69 | YES — CONTROL IS EXAMPLE NO. 7 |
| 5 | 5.0% Silicone-Pt complex-nylon 6/6 mixture | Polypropylene | 20 | 1.22 | 3.84 | 45.37 | YES — CONTROL IS EXAMPLE NO. 7 |
| 6 | 10.0% Silicone-Pt complex-nylon 6/6 mixture | Polypropylene | 20 | 1.21 | 3.84 | 49.28 | YES — CONTROL IS EXAMPLE NO. 7 |
| 7 | Control, no additives | Polypropylene | 20 | 10.75 | — | — | CONTROL SAMPLE |

I claim:

1. A method for producing a flame-retardant thermoplastic polymer carpet or textile fiber comprising the steps of:
   (a) forming a polyamide mixture having (i) at least about 80% by weight of a polyamide, wherein at least 90% of the polyamide is at least one nylon selected from the group consisting of nylon 6, nylon 6/6, copolymers thereof, and combinations thereof, and (ii) a vulcanizable additive containing (1) a thermoplastic matrix polymer, (2) silicones in an amount between about 5% to about 20% based on the total weight of the vulcanizable additive, and (3) a platinum complex catalyst, said additive being present in the polyamide mixture in an amount between about 0.05% to about 20% by weight of the polyamide mixture to obtain less than about 1.0% by weight of said silicones in the polyamide mixture sufficient to render the polyamide more flame retardant than the polyamide is without the additive;
   (b) melt blending the polyamide mixture at a temperature of from about 250° C. to about 300° C. to form a melt-blend of the polyamide and the additive;
   (c) melt spinning the melt-blend from step (b) into fibers having a denier per filament from about 6 to about 35;
   (d) drawing the fibers; and
   (e) treating the drawn fibers in a crimping device to impart texture and bulk thereto.

2. The method of claim 1, wherein step (a) is practiced so that said additive is present in the polyamide mixture in an amount from 0.25% to about 20% by weight of the polyamide mixture.

3. The method of claim 1, wherein the additive contains silicone in an amount from about 5% to about 20% by weight of the additive.

4. The method of claim 1, wherein step (a) further comprises adding a zinc compound to the polyamide mixture in an amount from about 0.1% to about 5.0% by weight of the polyamide mixture.

5. The method of claim 4 wherein the zinc compound is selected from the group consisting of:
   zinc borate;
   zinc oxide;
   zinc hydroxide; and
   mixtures thereof.

6. The method of claim 3, wherein step (a) further comprises adding a zinc compound to the polyamide mixture in an amount from about 0.1% to about 5.0% by weight of the polyamide mixture.

7. The method of claim 6 wherein the zinc compound is selected from the group consisting of;

zinc borate;

zinc oxide;

zinc hydroxide; and mixtures thereof.

8. A method for producing a flame-retardant thermoplastic polymer carpet or textile fiber comprising the steps of:

(a) forming a polyamide mixture having (i) at least about 80% by weight of a polyamide, wherein at least 90% of the polyamide is at least one nylon selected from the group consisting of nylon 6, nylon 6/6, copolymers thereof, and combinations thereof, and (ii) a vulcanizable additive containing (1) a thermoplastic matrix polymer, (2) silicones in an amount between about 5% to about 20% based on the total weight of the vulcanizable additive, and (3) a platinum complex catalyst, said additive being present in the polyamide mixture in an amount between about 0.05% to about 20% by weight of the polyamide mixture to obtain less than about 0.5% by weight of said silicones in the polyamide mixture sufficient to render the polyamide more flame retardant than the polyamide is without the additive;

(b) melt blending the polyamide mixture at a temperature of from about 250° C. to about 300° C. to form a melt-blend of the polyamide and the additive;

(c) melt spinning the melt-blend from step (b) into fibers having a denier per filament from about 6 to about 35;

(d) drawing the fibers; and (e) treating the drawn fibers in a crimping device to impart texture and bulk thereto.

9. The method of claim 8, wherein step (a) is practiced so that said additive is present in the polyamide mixture in an amount from 0.25% to about 20% by weight of the polyamide mixture.

10. The method of claim 8, wherein the additive contains silicone in an amount from about 5% to about 20% by weight of the additive.

11. The method of claim 8, wherein step (a) further comprises adding a zinc compound to the polyamide mixture in an amount from 0.1% to about 5.0% by weight of the polyamide mixture.

12. The method of claim 11, wherein the zinc compound is selected from the group consisting of zinc borate, zinc oxide, zinc hydroxide, and mixtures thereof.

13. The method of claim 10, wherein step (a) further comprises adding a zinc compound to the polyamide mixture in an amount from 0.1% to about 5.0% by weight of the polyamide mixture.

14. The method of claim 13, wherein the zinc compound is selected from the group consisting of zinc borate, zinc oxide, zinc hydroxide, and mixtures thereof.

* * * * *